April 11, 1961  V. E. HENLEY  2,979,110
EXPANSIBLE TIRE BUILDING DRUM
Filed Jan. 2, 1958  2 Sheets-Sheet 1

INVENTOR
Virgil E. Henley
BY
ATTORNEYS

April 11, 1961 V. E. HENLEY 2,979,110
EXPANSIBLE TIRE BUILDING DRUM
Filed Jan. 2, 1958 2 Sheets-Sheet 2
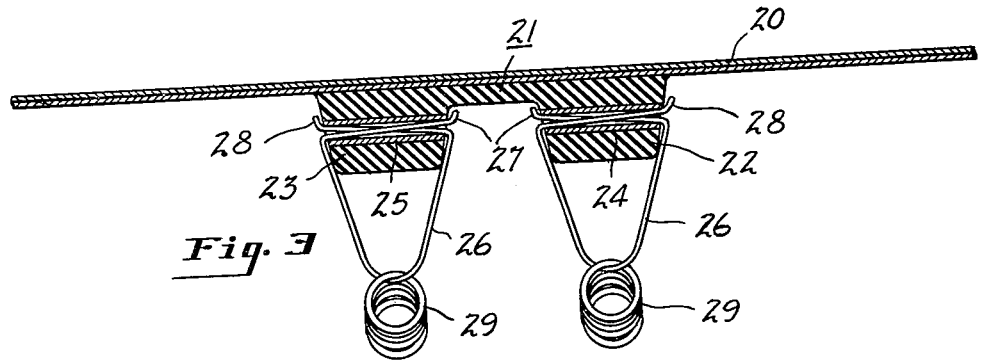
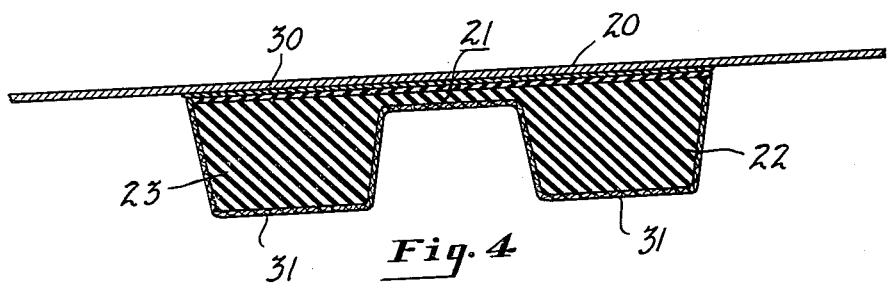
INVENTOR
*Virgil E. Henley*
ATTORNEYS United States Patent Office 2,979,110
Patented Apr. 11, 1961

2,979,110

EXPANSIBLE TIRE BUILDING DRUM

Virgil E. Henley, Akron, Ohio, assignor to The General Tire & Rubber Company, Akron, Ohio, a corporation of Ohio Filed Jan. 2, 1958, Ser. No. 706,673

8 Claims. (Cl. 154—10)

This invention relates to expansible tire building drums of the type having spaced expansible end members such as disclosed in patent to Kraft 2,614,952, granted October 21, 1952 and more particularly to the expansible and contractible band that serves to bridge the space between the expansible end cylinders.

In building tires by the method disclosed in the patent above referred to, the ends of a fabric band on the drum which project past the ends of the drum are confined within inextensible bead rings that are held in positions surrounding the projecting ends of the band closely adjacent the ends of the drum while the drum is expanded to an external diameter such that the bead rings are positioned in engagement with fabric folded inwardly over the drum shoulders after which the edges of the fabric band are folded over the bead rings to enclose the same.

The cylindrical peripheries of the expansible end members of the drum are formed of flexible resilient sheet metal segments which overlie inflatable endless rubber tubes that are transversely flat when deflated and which are rigidly supported so that they expand radially outwardly when inflated.

In order to provide a circumferentially continuous peripheral wall bridging the space between the expansible end members, a bridging band comprising a series of circumferentially overlapping segments is provided and this band is provided interiorly thereof with means for maintaining a radial inward thrust on the segments which holds the segments against the peripheral faces of the expansible end members and which yieldingly resists expansion of the bridging band.

In order to provide the desirable flexibility, the segments are formed of thin resilient sheet metal and means must be provided for holding the segments against axial and circumferential displacement.

It is also desirable that the bridging band be so connected to the end members that it will permit the end members to be adjusted axially to lengthen or shorten the drum, as is desirable for fabric bands of different thicknesses and to permit variations in the spacings of the tire beads.

The present invention provides improved means for positioning the bridging band with respect to the expansible members, for positioning the segments with respect to one another, for stiffening the segments in such manner as to maintain uniform circumferential flexibility, and for so connecting the segments to the expansion resisting means that concentration of stresses at the anchoring points is avoided.

Reference should be had to the accompanying drawings forming a part of this specification, in which:

Fig. 3 is a fragmentary section on an enlarged scale taken on the line indicated at 3—3 in Fig. 2; and Fig. 4 is a fragmentary section on an enlarged scale, taken on the line indicated at 4—4 in Fig. 2.

Figure 1:
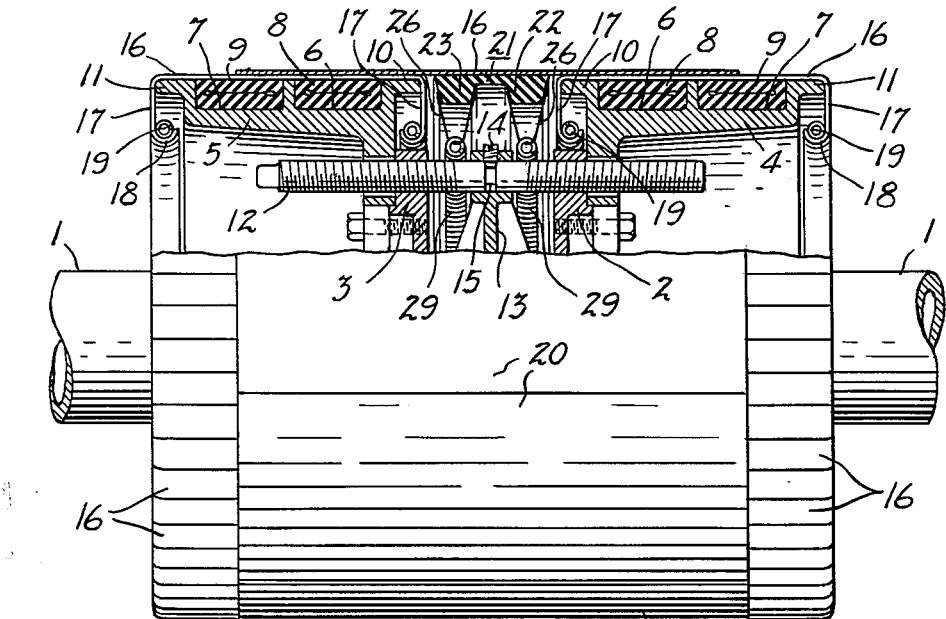
Figure 1 is a side elevation of the tire building drum with peripheral portions broken away and shown in longitudinal section.

Referring to the accompanying drawings, the tire building drum of the present invention is mounted upon a supporting shaft 1 having hub members 2 and 3 slidably mounted thereon. Rigid rings 4 and 5 are detachably secured to the hubs 2 and 3 and provide supports for the expansible end members of the drum. The rings 4 and 5 may be of identical construction and the periphery of each is provided with a pair of circumferential grooves 6 and 7 which have cylindrical bottoms and which receive endless inflatable rubber tubes 8 and 9. At opposite peripheral edges thereof the rings 4 and 5 have flanges 10 and 11 which are externally cylindrical. The inflatable tubes 8 and 9 are transversely flat when deflated and fit in the grooves 6 and 7 with their external faces substantially flush with the cylindrical surfaces of the flanges 10 and 11. The hubs 2 and 3 with their attached rings 4 and 5 are slidable on the shaft 1 and may be adjusted axially by means of a right and left hand screw 12 that has a threaded engagement with the hubs 2 and 3 and that is journaled in a central spider 13 fixed to the shaft 1, the screw 12 being held against axial movement by suitable means such as a screw 14 engaging in a groove 15 in the bearing portion of the screw.

Each of the rings 4 and 5 carries an expansible covering band formed by a series of arcuate segments 16 that extend across the external faces of the tubes 8 and 9 and that have inturned end portions 17 that are disposed at right angles to the body portions of the segments and that overhang the flanges 10 and 11. The inner ends of the portions 17 are bent inwardly at 18 to provide retaining seats for endless helical garter springs 19 that are under tension and that maintain a radial inward thrust on the segments 16 to hold them tightly against the exterior faces of the tubes 8 and 9 during expansion of the tubes. The contraction of the cylinder formed by the segments 16 is limited by the flanges 10 and 11 and the expansion of the cylinders is limited by engagement of the garter springs 19 with the interior faces of the flanges 10 and 11. The springs 19 serve to normally hold the expansible end members of the drum to a minimum external diameter and are expansible to permit the end members to be expanded to a maximum external diameter where the springs 19 engage with the interior faces of the flanges 10 and 11.

The central portion of the peripheral wall of the expansible drum is in the form of an expansible band composed of a series of circumferentially overlapping arcuate segments 20. The segments 20, which may be identical, are preferably of a length to overlie the major portions of the peripheries of the two expansible members and the arcuate length of the segments is such that there is a substantial overlap of the segments throughout the range of expansion and contraction.

Each of the arcuate sections 20 has a circumferentially extending positioning and stiffening member 21 attached to its interior face which are in the form of rectangular elastic rubber blocks of substantial thickness. The rubber blocks 21 are positioned between the inner flanges 10 of the adjustable end members of the drum and serve to limit axial displacement of the bridging band. One end of each block 21 is closely adjacent the underlapping end of an adjacent segment so that the blocks also serve to limit circumferential displacement of individual segments 20. Each of the stiffening blocks 21 is formed to provide a pair of axially spaced circumferentially extending ribs 22 and 23 that are disposed along opposite side edges of the blocks, and the blocks are alined circumferentially so that the ribs 22 and 23 of the stiffening blocks are arranged in circumferential rows.

Figure 2:
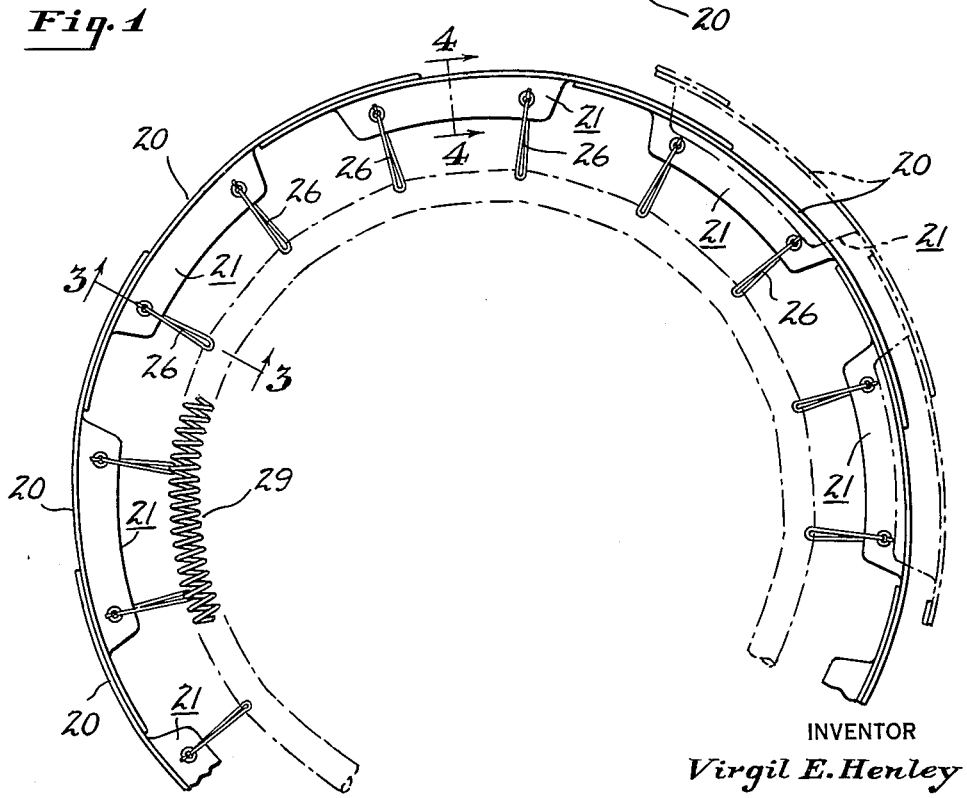
Fig. 2 is a transverse vertical section through the drum.

As shown in Fig. 3, the ribs 22 and 23 have transverse openings in which metal tubes 24 and 25 are secured. The openings provided by the tubes 24 and 25 are located adjacent opposite ends of the stiffening blocks 21 as shown in Fig. 2 of the drawings and a wire loop 26 is secured in each of the openings, each loop 26 having ends 27 and 28 that extend through the rib opening and that are anchored to the ends of the metal tubes. The loops 26 support an endless helically coiled garter spring 29 within each of the rows of ribs 22 and 23. The garter springs 29 exert a radial inward thrust on each of the stiffening blocks 21 adjacent the ends thereof to hold each of the segments 20 in close engagement with the expansible end members of the drum during the expansion and contraction of said members. The rubber blocks 21 are bonded to the interior of the spring steel sheet metal segments 20 by means of a layer of rubber-to-metal adhesive stock 30 and the exposed faces of the rubber blocks are preferably covered with a layer of nylon fabric 31. The rubberized nylon fabric 31 and the metal tubes 24 and 25 are applied to the blocks prior to vulcanization so that they are firmly bonded to the blocks.

As shown in Fig. 2, the stiffening blocks 21 are positioned with one end closely adjacent the underlapping end of one adjacent segment and are of a length to extend a substantial distance past the overlapping end of the other adjacent segment. The stiffening blocks 21 are of substantial length, the sum of the arcuate lengths of the blocks being considerably more than half the circumference of the band when the band is expanded to its maximum diameter. In order to provide segments which will readily adjust themselves to the changing curvature as the drum is expanded, it is necessary to make the segments of relatively thin sheet metal. By employing stiffening members in the form of elastic rubber blocks, the segments are materially strengthened without greatly reducing their flexibility.

It will be understood that the dimensions of the rubber stiffening blocks and the number of segments may be varied, but it is desirable that the stiffening block be of a width to provide a substantial axial spacing of the spring 29 and that the arcuate length thereof be sufficient to maintain substantially uniform circumferential flexibility. As herein shown, each of the eight segments 20 that form the bridging band is of about 70° circumferential length so that a substantial overlap is provided between the ends of the segments and the circumferential extent of the cushioning blocks is substantially 33°, the angles being measured in the contracted position of the drum shown in full lines in Fig. 2. The segments 20 may be made of a 30 gauge metal sheet and an effective stiffening is provided by the rubber blocks 21 the rib portions of which are of about ⅝" radial thickness.

The radial inward thrust is applied by the springs 29 to each of the segments 20 at opposite ends o fthe rubber stiffening blocks 21 and at axially spaced points, each segment being connected to the contractible garter springs at four points and the points of attachment being substantially uniformly spaced circumferentially. The resilient anchoring connections through which the pull of the garter springs 29 is transmitted to the segments 20 distribute the radial inward thrusts applied to each segment in such manner as to avoid severe localized stresses and unequal flexing during expansion and contraction.

The resilient anchoring connection to the interior of the thin sheet metal segments of the bridging band, makes it possible to maintain an adequate contracting thrust on the segments without creating excessive stresses at anchoring points and excessive localized flexing which has a destructive effect on the thin resilient sheet metal.

It is to be understood that in accordance with the provisions of the patent statutes, variations and modifications of the specific devices herein shown and described may be made without departing from the spirit of the invention.

What I claim is:

1. In a tire building drum having two coaxial axially spaced externally cylindrical expansible and contractible end members and provided with means for expanding and contracting said members and means for limiting the expansion and contraction thereof to maximum and minimum external diameters, the combination therewith of an expansible and contractible bridging band telescopically receiving said end members, conforming to the curvature thereof and bridging the space between them, said band comprising a series of arcuate resilient sheet metal segments overlapping circumferentially, each segment overlapping one adjacent segment and being overlapped by the other adjacent segment, and spring means within said band for exerting a radial inward thrust on each of said segments at circumferentially and axially spaced points to yieldingly resist expansion of said band and to hold said band in place on said end members, said points of thrust on said segments being alined circumferentially in axially spaced rows.

2. The tire building drum as claimed in claim 1 in which the spring means resisting expansion of the bridging band comprises two axially spaced helically coiled annular garter springs within the band, each connected to each segment of the band at circumferentially spaced points, the points of connection of one of said springs to the segments being spaced axially from the points of connection of the other of said springs.

3. In a tire building drum having two coaxial axially spaced externally cylindrical expansible and contractible end members and provided with means for expanding and contracting said members and means for limiting the expansion and contraction thereof to maximum and minimum external diameters, the combination therewith of an expansible and contractible bridging band telescopically receiving said end members, conforming to the curvature thereof and bridging the space between them, said band comprising a series of arcuate resilient sheet metal segments overlapping circumferentially, each segment overlapping one adjacent segment and being overlapped by the other adjacent segment, stiffening means for said band comprising a substantially rectangular elastic rubber block bonded to the interior face of each segment intermediate its ends and projecting inwardly between said end members, the sum of the arcuate lengths of said blocks being in excess of one half the circumference of said band when expanded to its maximum diameter, one end of each block being spaced from the overlapping axial edge of its segment a distance sufficient to accommodate the underlapping edge of one adjacent segment when the band is contracted and being of a length to extend past the overlapping edge of the other adjacent segment throughout the range of expansion of the band, and spring means exerting a radial inward thrust on opposite ends of each of said blocks to yieldingly resist expansion of said band.

4. The building drum as claimed in claim 3 in which the spring means resisting expansion of the bridging band is a contractible spring annulus within the band and having circumferentially spaced connections to opposite ends of each of the rubber stiffening blocks.

5. The building drum as claimed in claim 3 in which the rubber stiffening blocks have axially spaced inwardly projecting ribs disposed in two axially spaced circumferential rows and in which expansion of the bridging band is resisted by two annular helically coiled axially spaced garter springs within the band and each having circumferentially spaced connections to the opposite ends of each of the ribs of one of said rows.

6. The building drum as claimed in claim 5 in which each of the inwardly projecting ribs of the rubber stiffening blocks has transverse openings adjacent its ends in which metal tubes are received and in which each garter spring is connected to circumferentially alined ribs by wires looped through coils thereof and having ends extending through said tubes.

7. The building drum as claimed in claim 5 in which each of the rubber stiffening blocks has a fabric covering bonded thereto.

8. In a tire building drum having two coaxial axially spaced externally cylindrical expansible and contractible end members and provided with means for expanding and contracting said members and means for limiting the expansion and contraction thereof to maximum and minimum external diameters, the combination therewith of an expansible and contractible bridging band telescopically receiving said end members, conforming to the curvature thereof and bridging the space between them, said band comprising a series of arcuate resilient sheet metal segments overlapping circumferentially, each segment overlapping one adjacent segment and being overlapped by the other adjacent segment, an elastic rubber block bonded to the interior of each segment, spring means resisting expansion of said bridging band comprising an annular helically coiled garter spring within said band, and means flexibly connecting said spring to each of said blocks.

References Cited in the file of this patent

UNITED STATES PATENTS

| | | |
|---|---|---|
| 1,734,835 | Strum | Nov. 5, 1929 |
| 1,877,746 | Hesston et al. | Sept. 13, 1932 |
| 2,042,498 | Bostwick | June 2, 1936 |
| 2,084,009 | Sohl | June 15, 1937 |
| 2,614,951 | Iredell | Oct. 21, 1952 |
| 2,614,952 | Kraft | Oct. 21, 1952 |
| 2,715,932 | Frazier | Aug. 23, 1955 |
| 2,838,091 | Kraft | June 10, 1958 |
| 2,838,092 | McMahon | June 10, 1958 |